(12) United States Patent
Feng et al.

(10) Patent No.: US 9,369,399 B2
(45) Date of Patent: Jun. 14, 2016

(54) BANDWIDTH ALLOCATION METHOD AND DEVICE

(71) Applicant: Huawei Device Co., Ltd., Shenzhen (CN)

(72) Inventors: Dayang Feng, Wuhan (CN); Jin Li, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 577 days.

(21) Appl. No.: 13/826,135

(22) Filed: Mar. 14, 2013

(65) Prior Publication Data

US 2013/0275597 A1    Oct. 17, 2013

(30) Foreign Application Priority Data

Apr. 6, 2012  (CN) .......................... 2012 1 0098776

(51) Int. Cl.
*G06F 11/30* (2006.01)
*H04L 12/911* (2013.01)
*H04L 12/24* (2006.01)

(52) U.S. Cl.
CPC ............ *H04L 47/70* (2013.01); *H04L 41/0896* (2013.01); *H04L 41/142* (2013.01); *H04L 41/147* (2013.01); *H04L 41/5025* (2013.01);
(Continued)

(58) Field of Classification Search
CPC ....... H04L 47/70; H04L 47/72; H04L 47/823; H04L 47/822; H04L 41/5025; H04L 41/147; H04L 41/0896; H04L 41/142
USPC ........... 709/226, 224; 718/104, 105, 102, 100
See application file for complete search history.

(56) References Cited

U.S. PATENT DOCUMENTS

| 5,884,037 A | 3/1999 | Aras et al. |
| 5,913,041 A * | 6/1999 | Ramanathan ....... H04L 12/2602 709/233 |
| 7,274,667 B2 | 9/2007 | McKinnon, III et al. |

(Continued)

FOREIGN PATENT DOCUMENTS

| CN | 1737835 A | 2/2006 |
| CN | 101599871 A | 12/2009 |

(Continued)

OTHER PUBLICATIONS

Extended European Search Report issued in corresponding European Patent Application No. 13160131.2, mailed Jul. 8, 2013, 5 pages.

(Continued)

*Primary Examiner* — Kenneth R Coulter
(74) *Attorney, Agent, or Firm* — Brinks Gilson & Lione

(57) ABSTRACT

The present invention provides a bandwidth allocation method and device. The method includes: collecting a bandwidth historical data sequence; obtaining a bandwidth trend sequence value and a bandwidth fluctuation sequence value according to the collected bandwidth historical data sequence; obtaining a forecast sequence value of a bandwidth fluctuation sequence according to the bandwidth fluctuation sequence value; obtaining a bandwidth forecast sequence value according to the bandwidth trend sequence value and the forecast sequence value of the bandwidth fluctuation sequence; and allocating bandwidth according to the bandwidth forecast sequence value. Embodiments of the present invention are capable of improving the accuracy of bandwidth forecast, thereby allocating bandwidth more properly.

19 Claims, 4 Drawing Sheets

(52) U.S. Cl.
CPC .............. *H04L 47/72* (2013.01); *H04L 47/823* (2013.01); *H04L 47/822* (2013.01)

(56) References Cited

U.S. PATENT DOCUMENTS

| | | |
|---|---|---|
| 2001/0038640 A1 | 11/2001 | McKinnon, III et al. |
| 2002/0172222 A1 | 11/2002 | Ullmann et al. |
| 2006/0069621 A1 | 3/2006 | Chang et al. |
| 2007/0002743 A1* | 1/2007 | Fan ...................... H04W 28/20 370/235 |
| 2007/0076728 A1 | 4/2007 | Rieger et al. |
| 2008/0275983 A1 | 11/2008 | Ullmann et al. |
| 2010/0254707 A1* | 10/2010 | Peng ....................... H04L 47/10 398/58 |

FOREIGN PATENT DOCUMENTS

| | | |
|---|---|---|
| CN | 102143484 A | 8/2011 |
| CN | 102333106 A | 1/2012 |

OTHER PUBLICATIONS

Jin et al., "Prediction-Based Bandwidth Allocation for VBR Traffic" Transactions of Tianjin University, vol. 7, No. 4, Dec. 2001.

* cited by examiner

BANDWIDTH ALLOCATION METHOD AND DEVICE

CROSS-REFERENCE TO RELATED APPLICATION

This application claims priority to Chinese Patent Application No. 201210098776.2, filed on Apr. 6, 2012, which is hereby incorporated by reference in its entirety.

FIELD OF THE INVENTION

The present invention relates to network communication technologies, and in particular, to a bandwidth allocation method and device.

BACKGROUND OF THE INVENTION

With the development of multimedia data services, multimedia data services such as high-definition digital TV broadcast, network news broadcast, wireless channel multimedia transmission, online gaming, video conferencing, and streaming media transmission continue to emerge, and a multimedia bandwidth allocation algorithm plays a very important role in multimedia network performance analysis.

A variable bit rate (Variable Bit Rate, VBR) service in a home gateway is a multimedia data service. VBR video streams are relatively bursty, which may easily cause network congestion, thereby affecting the quality of service (Quality of Service, QoS). In the prior art, the QoS may be guaranteed by resource reservation; however, the bandwidth utilization is very low in this mode. To solve the problem of low bandwidth utilization, a fractional autoregressive integrated moving average (Fractional Auto-Regression Integrated Moving Average, FARIMA) model may be used to perform traffic forecast for the VBR service, and then allocate bandwidth according to the forecast traffic. However, the FARIMA model in the prior art has low accuracy in forecasting non-stable traffic.

SUMMARY OF THE INVENTION

An embodiment of the present invention provide a bandwidth allocation method, including: collecting a bandwidth historical data sequence; obtaining a bandwidth trend sequence value and a bandwidth fluctuation sequence value according to the collected bandwidth historical data sequence; obtaining a forecast sequence value of a bandwidth fluctuation sequence according to the bandwidth fluctuation sequence value; obtaining a bandwidth forecast sequence value according to the bandwidth trend sequence value and the forecast sequence value of the bandwidth fluctuation sequence; and allocating bandwidth according to the bandwidth forecast sequence value.

An embodiment of the present invention further provide a bandwidth allocation device, including: an collecting module configured to collect a bandwidth historical data sequence; a trend module configured to obtain a bandwidth trend sequence value and a bandwidth fluctuation sequence value according to the collected bandwidth historical data sequence; a fluctuation forecast module configured to obtain a forecast sequence value of a bandwidth fluctuation sequence according to the bandwidth fluctuation sequence value; a bandwidth forecast module configured to obtain a bandwidth forecast sequence value according to the bandwidth trend sequence value and the forecast sequence value of the bandwidth fluctuation sequence; and an allocation module configured to allocate bandwidth according to the bandwidth forecast sequence value.

It can be seen from the above technical solutions that, because the bandwidth forecast sequence value is obtained according to the obtained bandwidth trend sequence value and forecast sequence value of the bandwidth fluctuation sequence, and the bandwidth is allocated according to the bandwidth forecast sequence value, the accuracy of bandwidth forecast for non-stable traffic can be improved, and thereby the allocation efficiency of bandwidth resources is improved.

DETAILED DESCRIPTION OF THE EMBODIMENTS

Figure 1:
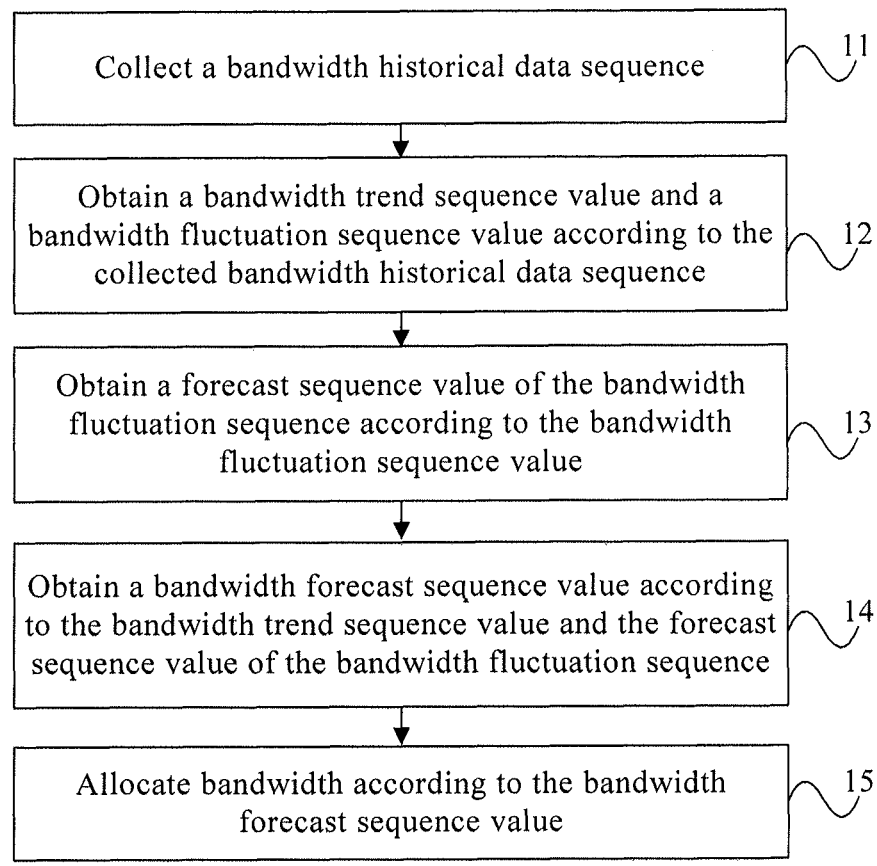
FIG. 1 is a schematic flowchart of a bandwidth allocation method according to an embodiment of the present invention.

FIG. 1 is a schematic flowchart of a bandwidth allocation method according to an embodiment of the present invention, including:

Step 11: Collect a bandwidth historical data sequence.

The historical data sequence refers to a historical data sequence of bandwidth (or referred to as traffic). A sliding window may be set, and data within the window is collected data. Assuming that the size of the sliding window is N, the collected bandwidth historical data sequence may be expressed as $x_1, x_2 \ldots x_N$. In this embodiment, when the bandwidth historical data sequence is collected, a reference time unit may be a month, day, hour, minute, or second. For example, within the size N of the sliding window, the bandwidth historical data sequence within 2 months is collected, or the bandwidth historical data sequence within 180 days is collected, or the bandwidth historical data sequence within, or 8 hours is collected, or the bandwidth historical data sequence within 180 seconds is collected.

Step 12: Obtain a bandwidth trend sequence value and a bandwidth fluctuation sequence value according to the collected bandwidth historical data sequence.

Figure 2:
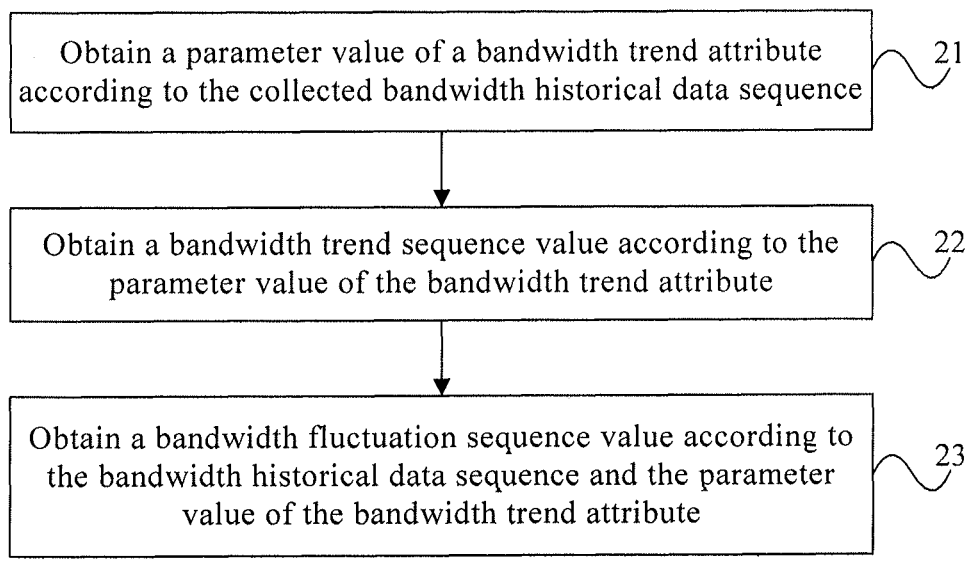
FIG. 2 is a schematic flowchart for obtaining a bandwidth fluctuation sequence value according to the present invention.

Referring to FIG. 2, in this embodiment, the step of obtaining a bandwidth fluctuation sequence value according to the bandwidth historical data sequence may include:

Step 21: Obtain a parameter value of a bandwidth trend attribute according to the collected bandwidth historical data sequence. When the parameter value of the bandwidth trend attribute is solved, a least squares solution of an equation formed by the bandwidth historical data sequence and a forecast sequence corresponding to the bandwidth historical data sequence may be determined as the parameter value of the bandwidth trend attribute, where the forecast sequence corresponding to the bandwidth historical data sequence is a function related to the parameter value of the bandwidth trend attribute.

The trend attribute may be a linear attribute (first power attribute), a second power attribute, and the like. Using the linear attribute as an example, a relationship between the forecast sequence corresponding to the bandwidth historical data sequence and a parameter value of the linear attribute may be expressed as $x_1'=c_0+c_1 \times t$, $t=1, \ldots, N$, where $x_1'$ is the forecast sequence of the bandwidth historical data sequence, $c_0$ and $c_1$ are parameter values of the linear attribute, and t is a time sequence.

The equation formed by the bandwidth historical data sequence and the forecast sequence corresponding to the bandwidth historical data sequence may be expressed as $x_1-x_1'=x_1-(c_0+c_1 \times t)=0$, and the least squares solution of the equation is the solution of the least $c_0$ and $c_1$ satisfying $$\sum_{t=1}^{N}(x_t - x_t')^2 = \sum_{t=1}^{N}(x_t - c_0 - c_1 t)^2.$$

Step 22: Obtain a bandwidth trend sequence value according to the parameter value of the bandwidth trend attribute.

The bandwidth trend sequence value refers to a sequence in a set number of steps after the existing bandwidth historical data sequence, and may be obtained according to the parameter value of the bandwidth trend attribute and the time corresponding to bandwidth data to be forecast. For example, if the bandwidth data of h steps needs to be forecast, the bandwidth trend sequence value may be expressed as $f_{N+i}^* = c_0 + c_1(N+i)$, $i=1, \ldots, h$, where N+i represents time, and N represents the size of the sliding window.

In this embodiment, the number of steps may be understood as time, and the unit of the time needs to be the same as the time unit referenced when the bandwidth historical data sequence is collected in step 11.

So far, according to the above step 21 and step 22, the parameter values $c_0$ and $c_1$ of the bandwidth trend attribute and the bandwidth trend sequence value $f_{N+1}^*$ may be obtained.

Step 23: Obtain a bandwidth fluctuation sequence value according to the bandwidth historical data sequence and the parameter value of the bandwidth trend attribute.

According to the parameter value of the bandwidth trend attribute and time, the forecast sequence of the bandwidth historical data sequence corresponding to the time may be obtained. The fluctuation sequence refers to a difference sequence between an actual sequence and a forecast sequence of the bandwidth historical data sequence corresponding to the same time.

For example, for the time t, the actual sequence value of the bandwidth historical data sequence corresponding to the time is $x_1$, and the forecast sequence value of the bandwidth historical data sequence corresponding to the time, which is obtained according to the parameter value of the bandwidth trend attribute and the time, is $x_1'=c_0+c_1 \times t$, and then the bandwidth fluctuation sequence value $e_1$ is $x_1-x_1'$.

In other words, the bandwidth fluctuation sequence value $e_1$ may be expressed as $E_1=x_1-c_0-c_1 t$, $t=1, \ldots, N$.

Step 13: Obtain a forecast sequence value of the bandwidth fluctuation sequence according to the bandwidth fluctuation sequence value.

Figure 3:
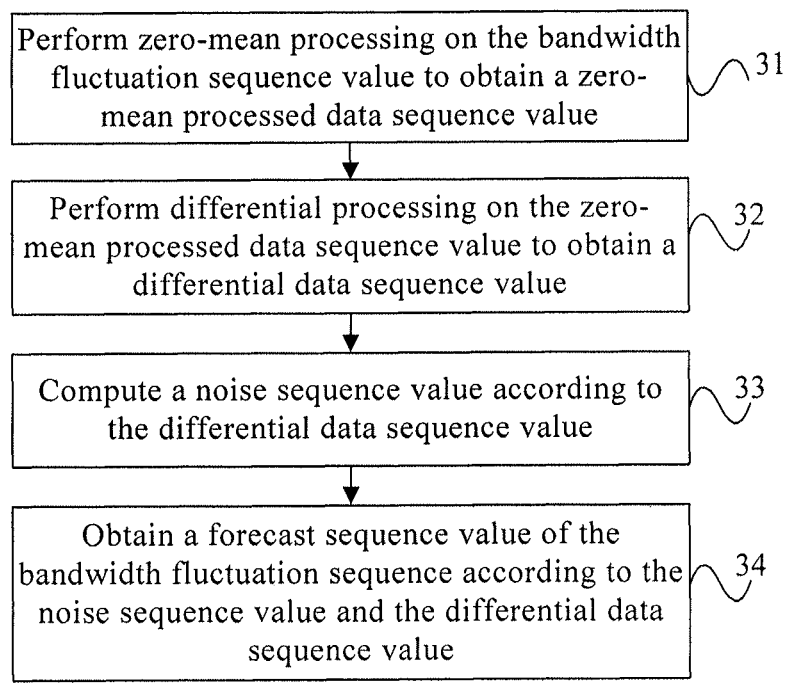
FIG. 3 is a schematic flowchart for obtaining a forecast sequence value of a fluctuation sequence according to the present invention.

Referring to FIG. 3, in this embodiment, the step of obtaining a forecast value of the bandwidth fluctuation sequence $e_{N+i}$ ($i=1, \ldots, h$) according to the bandwidth fluctuation sequence value $e_i$ ($t=1, \ldots, N$) may include:

Step 31: Perform zero-mean processing on the bandwidth fluctuation sequence value to obtain a zero-mean processed data sequence value. In this embodiment, it may also be understood as obtaining a zero-mean processed bandwidth fluctuation sequence value.

The zero-mean processing may be expressed as $e_i'=e_i-\text{mean}(e_i)$, where $e_i'$ is the zero-mean processed data sequence value, and $\text{mean}(e_i)$ is a mean value of $e_i$.

Step 32: Perform differential processing on the zero-mean processed data sequence value to obtain a differential data sequence value. In this embodiment, the differential processing may refer to the Taylor series differential. Therefore, the differential data sequence value $e''_t$ may be expressed as $$e_t'' = \Delta^d \times e_t' = (1-B)^d \times e_t' = \sum_{j=0}^{\infty} \binom{d}{j}(-B)^j \times e_t',$$

where $d=H-0.5$, H is a self-similarity Hurst exponent, which may be obtained by a rescaled-range (rescaled-range, R/S) algorithm, and B is a delay factor.

Step 33: Compute a noise sequence value according to the differential data sequence value.

A noise sequence of an Auto-regressive (Auto-regressive, AR) model may be obtained according to a one-dimensional Akaike information criterion (Akaike Information Criterion, AIC) and a least squares (Least Squares, LS) algorithm, where the one-dimensional AIC is used to balance accuracy and complexity of forecast. Computing the differential data sequence to obtain the noise sequence value according to the one-dimensional AIC and LS algorithm, may specifically be obtaining the noise sequence value by using the following simultaneous equation representing the one-dimensional AIC and equation representing the LS algorithm, respectively:

$$AIC(p) = N \times ln\varepsilon^2 + 2 \times p$$

$$\varepsilon_t = e_t'' - \sum_{r=1}^{p} \alpha_r e_{t-r}'', t = p+1, \ldots, N$$

where $\varepsilon_t$ is the noise sequence value, $e''_t$ is the differential data sequence value, p is an order, where the parameter p represents complexity, and $\alpha_r$ is a coefficient.

Step 34: Obtain a forecast sequence value of the bandwidth fluctuation sequence according to the noise sequence value and the differential data sequence value.

Firstly, the coefficient and order of the auto-regressive and moving average model (Auto-Regressive and Moving Average Model, ARMA) model may be obtained according to a two-dimensional AIC algorithm and the LS algorithm. The LS algorithm will use the noise sequence value obtained in the above step 33. The two-dimensional AIC algorithm includes a parameter σ indicating accuracy, and parameters p and q indicating complexity. Parameters for computing σ include the noise sequence value $\varepsilon_i$, the differential data sequence values $e''_i$, p, q, M, α, and β, where M is a function p and q, and parameters in a target function include α and β. Specifically, the following four simultaneous equations may be used to obtain the coefficient $\alpha_i, \beta_j$ and the order p,q of the ARMA model:

$$AIC(p, q) = N \times ln\sigma^2_{(p,q)} + 2 \times (p+q)$$

$$\sigma^2_{(p,q)} = \frac{1}{N-M} \sum_{t=M+1}^{N} \left( e''_t - \sum_{i=1}^{p} \alpha_i \times e''_{t-i} - \sum_{j=1}^{q} \beta_j \times \varepsilon_{t-j} \right)$$

$$M = \text{Max}(p, q)$$

$$obj(\alpha, \beta) = \min(|Y - Z \times \alpha - \varepsilon \times \beta|^2) = \min\left( \left\| Y - (Z, \varepsilon)\begin{pmatrix}\alpha\\\beta\end{pmatrix} \right\|^2 \right)$$

where Y is an array formed by part of differential data sequence values, and Z is an array formed by p differential data sequence values corresponding to elements in Y before, which may be expressed as:

$$Y = \begin{pmatrix} e''_{p+1} \\ e''_{p+2} \\ \vdots \\ e''_N \end{pmatrix}, Z = \begin{pmatrix} e''_p & e''_{p-1} & \cdots & e''_1 \\ e''_{p+1} & e''_p & \cdots & e''_2 \\ \vdots & \vdots & \cdots & \vdots \\ e''_{N-1} & e''_{N-2} & \cdots & e''_{N-p} \end{pmatrix}$$

In the prior art, parameters of the AR model and MA submodel are computed separately, and the computation results are not shared between each other, and as a result, the correlation between the AR model and the MA submodel is decoupled. In this embodiment, the parameter $\varepsilon_{r-j}$ of the AR model is used when the parameter of the ARMA model is computed, so that the AR model and the ARMA model may be correlated. Because an objective correlation relationship exists between the AR model and the ARMA model, compared with the prior art where the two are separated, the present invention may obtain a better forecast effect than the prior art by correlating the AR model and the ARMA model.

Secondly, after the coefficient $\alpha_i, \beta_j$ and the order p,q, of the ARMA model are obtained, the forecast sequence value of the fluctuation sequence $e_{N+i}$, i=1, ..., h may be obtained according to the coefficient $\alpha_i, \beta_j$, order p,q, differential data sequence value $e''_t$, and noise sequence value $\varepsilon_i$, where the computation equation may be:

$$e_{N+i} = (\alpha_1 \quad \alpha_2 \quad \cdots \quad \alpha_p) \times \begin{pmatrix} e''_N \\ e''_{N-1} \\ \vdots \\ e''_{N-p} \end{pmatrix} + (\beta_1 \quad \beta_2 \quad \cdots \quad \beta_q) \times \begin{pmatrix} \varepsilon_N \\ \varepsilon_{N-1} \\ \vdots \\ \varepsilon_{N-q} \end{pmatrix}$$

Step 14: Obtain a bandwidth forecast sequence value according to the bandwidth trend sequence value and the forecast sequence value of the bandwidth fluctuation sequence.

The bandwidth forecast sequence value is a sum of the bandwidth trend sequence value and the forecast sequence value of the bandwidth fluctuation sequence.

The bandwidth trend sequence value $f_{N+i}^* = c_0 + c_1(N+i)$ may be obtained by using step 12.

The forecast sequence value of the bandwidth fluctuation sequence $e_{N+i}$, i=1, ..., h may be obtained by using step 13.

Then, the two values may be added to obtain the bandwidth forecast sequence value $f_{N+i} = f_{N+i}^* + e_{N+i} = c_0 + c_1(N+i) + e_{N+i}$, i=1, ..., h, where N+i is a time parameter, and N represents the size of the sliding window.

Step 15: Allocate bandwidth according to the bandwidth forecast sequence value.

In this embodiment, the bandwidth is allocated according to the bandwidth forecast. Therefore, a forecast value at a certain moment in bandwidth forecast sequence values may be allocated to the moment, which may also be understood as allocating bandwidth corresponding to different moments to the corresponding moments according to the bandwidth forecast sequence values. For example, at a moment N+1, bandwidth $f_{N+1}$ is allocated, and at a moment N+2, bandwidth $f_{N+2}$ is allocated, and so on.

The bandwidth allocation method provided by this embodiment, because the bandwidth forecast sequence value is obtained according to an obtained bandwidth trend sequence value and forecast sequence value of the bandwidth fluctuation sequence, and the bandwidth is allocated according to the bandwidth forecast sequence value, is capable of improving the bandwidth forecast accuracy for non-stable traffic, thereby improving the allocation efficiency of bandwidth resources, reducing or avoiding network congestion, and finally improving the utilization of network resources.

Figure 4:
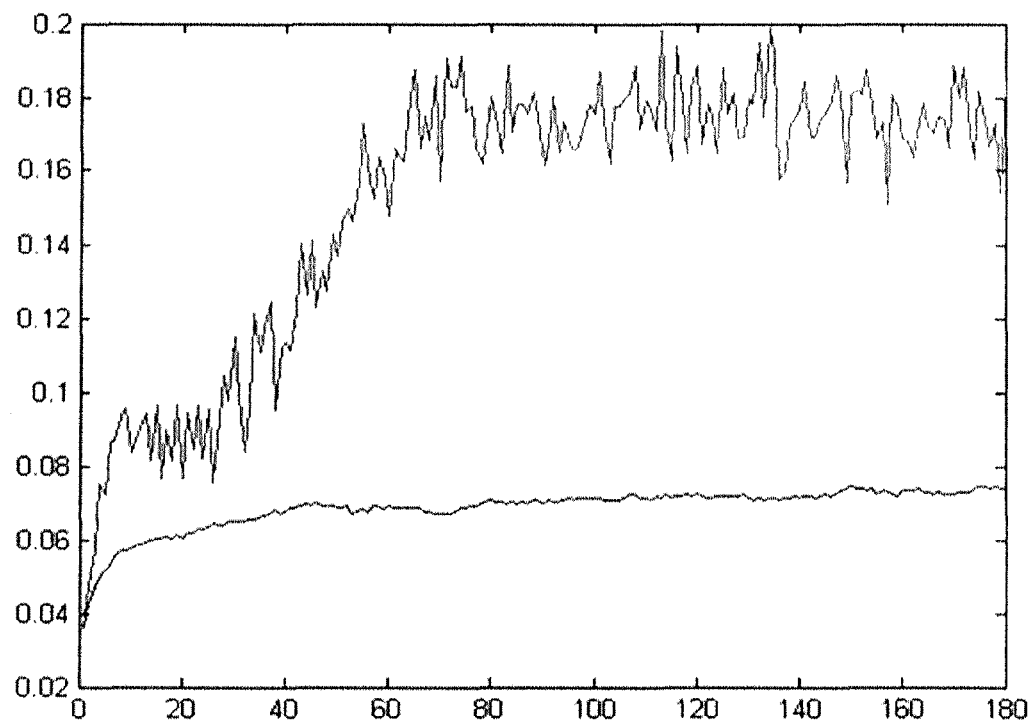
FIG. 4 is a schematic diagram of a simulation comparison between the present invention and the prior art.

To better describe the effect of the present invention, FIG. 4 presents a schematic diagram of a simulation comparison between the present invention and the FARIMA model used in the prior art.

In FIG. 4, values in the horizontal axis represent forecast time, and values in the vertical axis represent forecast average relative errors. In FIG. 4, the curve on the upper part is a simulation result of the conventional FARIMA model, and the curve on the lower part is a simulation result of the present invention. It can be seen from FIG. 4, regarding the same moment, the average relative error in the simulation result of the present invention is much lower than the average relative error in the simulation result of the prior art. In addition, as the forecast time increases, the average relative error in the simulation result of the prior art becomes bigger and bigger, while the average relative error in the simulation result of the present invention is obviously much lower than the average relative error of the prior art at the same moment. In other words, the present invention has higher forecast accuracy than the prior art. Therefore, the present invention is capable of greatly improving the forecast accuracy, which produces more obvious improvements when the forecast time is relatively long.

Figure 5:
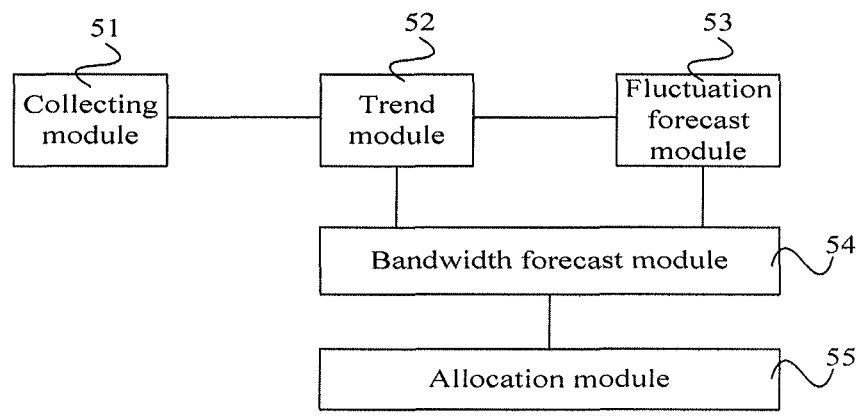
FIG. 5 is a schematic structural diagram of a bandwidth allocation device according to an embodiment of the present invention.

FIG. 5 is a schematic structural diagram of a bandwidth allocation device according to an embodiment of the present invention, including an collecting module 51, a trend module 52, a fluctuation forecast module 53, a bandwidth forecast module 54, and an allocation module 55.

In this embodiment, the collecting module 51 is configured to collect a bandwidth historical data sequence; the trend module 52 is configured to obtain a bandwidth trend sequence value and a bandwidth fluctuation sequence value according to the collected bandwidth historical data sequence; the fluctuation forecast module 53 is configured to obtain a forecast sequence value of the bandwidth fluctuation sequence according to the bandwidth fluctuation sequence value; the bandwidth forecast module 54 is configured to obtain a bandwidth forecast sequence value according to the bandwidth trend sequence value and the forecast sequence value of the bandwidth fluctuation sequence, where the bandwidth forecast module 54 is specifically configured to add the bandwidth trend sequence value and the forecast sequence value of the bandwidth fluctuation sequence to obtain the bandwidth forecast sequence value; and the allocation module 55 is configured to allocate bandwidth according to the bandwidth forecast sequence value.

Figure 6:
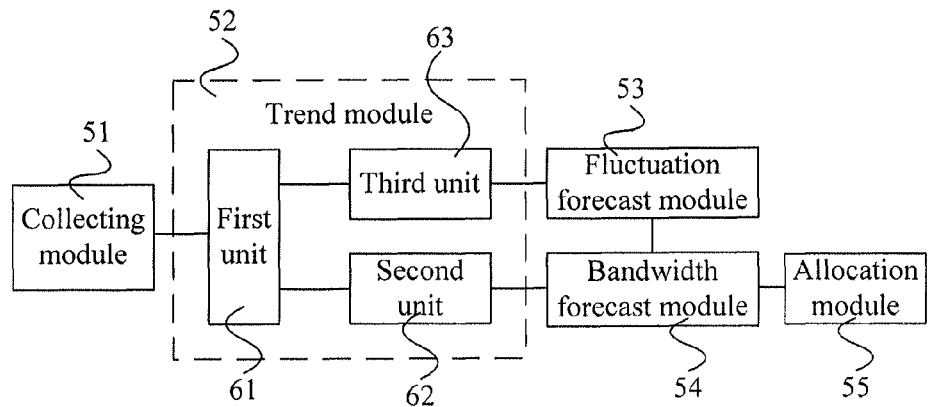
FIG. 6 is a schematic structural diagram of a bandwidth allocation device according to another embodiment of the present invention.

Referring to FIG. 6, the trend module 52 may include a first unit 61 and a second unit 62, where the first unit 61 is configured to obtain a parameter value of a bandwidth trend attribute according to the collected bandwidth historical data sequence, and the second unit 62 is configured to obtain a bandwidth trend sequence value according to the parameter value of the bandwidth trend attribute. Optionally, the first unit 61 is specifically configured to determine a least squares solution of an equation formed by the bandwidth historical data sequence and a forecast sequence corresponding to the bandwidth historical data sequence as the parameter value of the bandwidth trend attribute, where the forecast sequence of the bandwidth historical data sequence is a function related to the parameter value of the bandwidth trend attribute. The trend module 52 may also include a third unit 63 configured to obtain the bandwidth fluctuation sequence value according to the bandwidth historical data sequence and the parameter value of the trend attribute. Optionally, the third unit 63 is specifically configured to obtain a forecast sequence value corresponding to the bandwidth historical data sequence according to the parameter value of the bandwidth trend attribute, and obtain the bandwidth fluctuation sequence value according to an actual sequence value of the bandwidth historical data sequence and the forecast sequence value of the bandwidth historical data sequence corresponding to the same time. Optionally, the trend attribute is a first power attribute or a second power attribute.

Figure 7:
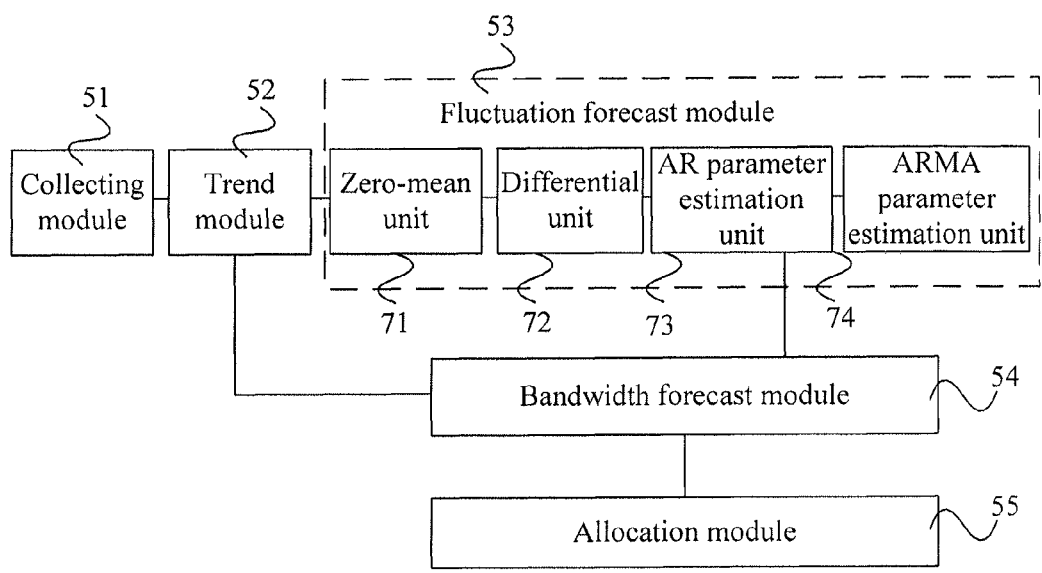
FIG. 7 is a schematic structural diagram of a bandwidth allocation device according to another embodiment of the present invention.

Referring to FIG. 7, the fluctuation forecast module 53 may include a zero-mean unit 71, a differential unit 72, an AR parameter estimation unit 73, and an ARMA parameter estimation unit 74, where the zero-mean unit 71 is configured to perform zero-mean processing on the bandwidth fluctuation sequence value to obtain a zero-mean processed data sequence value; the differential value 72 is configured to perform differential processing on the zero-mean processed data sequence value to obtain a differential data sequence value; the AR parameter estimation unit 73 is configured to compute a noise sequence value according to the differential data sequence value; and the ARMA parameter estimation unit 74 is configured to obtain a forecast sequence value of a bandwidth fluctuation sequence according to the noise sequence value and the differential data sequence value.

Optionally, the AR parameter estimation unit 73 is specifically configured to compute a noise sequence value according to a one-dimensional Akaike information criterion AIC and a least squares algorithm, where parameters in the least squares algorithm include a noise sequence value and a differential data sequence value. Specifically, the following two simultaneous equations may be used to obtain the noise sequence value:

$$AIC(p) = N \times ln\varepsilon^2 + 2 \times p$$

$$\varepsilon_t = e''_t - \sum_{r=1}^{p} \alpha_r e''_{t-r}, t = p+1, \ldots, N$$

where $\varepsilon_i$ is the noise sequence value, $e''_i$ is the differential data sequence value, p is an order, where the parameter p represents complexity, and $\alpha_r$ is a coefficient.

Optionally, the ARMA parameter estimation unit 74 is specifically configured to obtain the coefficient and order of an ARMA model according to a two-dimensional AIC algorithm and a least squares algorithm using the noise sequence value, and obtain a forecast sequence value of the fluctuation sequence according to the coefficient and order of the ARMA model, the differential data sequence value, and the noise sequence value. Specifically, the following four simultaneous equations may be used to obtain the coefficient and order of the ARMA model:

$$AIC(p, q) = N \times ln\sigma^2_{(p,q)} + 2 \times (p+q)$$

$$\sigma^2_{(p,q)} = \frac{1}{N-M} \sum_{r=M+1}^{N} \left( e''_r - \sum_{i=1}^{p} \alpha_i \times e''_{r-i} - \sum_{j=1}^{q} \beta_j \times \varepsilon_{r-j} \right)$$

$$M = \text{Max}(p, q)$$

$$obj(\alpha, \beta) = \min(|Y - Z \times \alpha - \varepsilon \times \beta|^2) = \min\left(\left|Y - (Z, \varepsilon)\begin{pmatrix}\alpha\\\beta\end{pmatrix}\right|^2\right)$$

where Y is an array formed by part of differential data sequence values, and Z is an array formed by p differential data sequence values corresponding to elements in Y before, which may be expressed as:

$$Y = \begin{pmatrix} e''_{p+1} \\ e''_{p+2} \\ \vdots \\ e''_N \end{pmatrix}, Z = \begin{pmatrix} e''_p & e''_{p-1} & \ldots & e''_1 \\ e''_{p+1} & e''_p & \ldots & e''_2 \\ \vdots & \vdots & \ldots & \vdots \\ e''_{N-1} & e''_{N-2} & \ldots & e''_{N-p} \end{pmatrix}$$

where $\varepsilon_i$ is the noise sequence value, $e''_i$ is the differential data sequence value, $\alpha_i, \beta_j$ is the coefficient of the ARMA model, and p,q is the order of the ARMA model.

The equation for computing the forecast sequence value of the fluctuation sequence $e_{N+i}$ may be:

$$e_{N+i} = (\alpha_1 \ \alpha_2 \ \ldots \ \alpha_p) \times \begin{pmatrix} e''_N \\ e''_{N-1} \\ \vdots \\ e''_{N-p} \end{pmatrix} + (\beta_1 \ \beta_2 \ \ldots \ \beta_q) \times \begin{pmatrix} \varepsilon_N \\ \varepsilon_{N-1} \\ \vdots \\ \varepsilon_{N-q} \end{pmatrix}$$

For the computation equations used by the units, reference may be made to the corresponding description in the above methods.

The bandwidth allocation device provided by this embodiment, because the bandwidth forecast sequence value is obtained according to an obtained bandwidth trend sequence value and forecast sequence value of the bandwidth fluctuation sequence, and the bandwidth is allocated according to the bandwidth forecast sequence value, is capable of improving the bandwidth forecast accuracy for non-stable traffic, thereby improving the allocation efficiency of bandwidth resources, reducing or avoiding network congestion, and finally improving the utilization of network resources.

Persons of ordinary skill in the art may understand that all or part of the steps in each of the foregoing method embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Finally, it should be noted that the above embodiments are merely intended for describing the technical solutions of the present invention, other than limiting the present invention.

Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A bandwidth allocation method, comprising:
performing by a home gateway, the following functions:
collecting a bandwidth historical data sequence over a sliding window size of N time moments;
obtaining a bandwidth trend sequence value being a sum of parameter values of bandwidth trend attribute, and a bandwidth fluctuation sequence value being a difference between $x_t$ and $x_t'$ according to the collected bandwidth historical data sequence, wherein $x_t$ is an actual sequence value of the bandwidth historical data sequence corresponding to time t, and $x_t'$ is a forecast sequence of the bandwidth historical data sequence;
obtaining a forecast sequence value of a bandwidth fluctuation sequence according to the bandwidth fluctuation sequence value;
obtaining a bandwidth forecast sequence value according to the bandwidth trend sequence value and the forecast sequence value of the bandwidth fluctuation sequence; and
allocating bandwidth according to the bandwidth forecast sequence value at each corresponding time moment N+i.

2. The method according to claim 1, wherein the step of obtaining a bandwidth trend sequence value comprises:
obtaining the parameter values of a bandwidth trend attribute according to the collected bandwidth historical data sequence; and
obtaining the bandwidth trend sequence value according to the parameter values of the bandwidth trend attribute.

3. The method according to claim 2, wherein the step of obtaining a parameter values of the bandwidth trend attribute according to the collected bandwidth historical data sequence comprises:
determining a least squares solution of an equation formed by the collected bandwidth historical data sequence $x_t$ and the forecast sequence $x_t'$ corresponding to the bandwidth historical data sequence as the parameter values of the bandwidth trend attribute, wherein the forecast sequence corresponding to the bandwidth historical data sequence is a function related to the parameter value of the bandwidth trend attribute.

4. The method according to claim 2, wherein the trend attribute is a first power attribute or a second power attribute.

5. The method according to claim 2, wherein the step of obtaining a bandwidth fluctuation sequence value comprises:
obtaining the bandwidth fluctuation sequence value according to the collected bandwidth historical data sequence $x_1, x_2 \ldots x_N$ and the parameter value of the bandwidth trend attribute.

6. The method according to claim 5, wherein the step of obtaining the bandwidth fluctuation sequence value according to the collected bandwidth historical data sequence and the parameter value of the bandwidth trend attribute comprises:
obtaining the forecast sequence value corresponding to the bandwidth historical data sequence $x_t'$ according to the parameter value of the bandwidth trend attribute; and
obtaining the bandwidth fluctuation sequence value according to the actual sequence value $x_t$ of the bandwidth historical data sequence and the forecast sequence value $x_t'$ of the bandwidth historical data sequence corresponding to the same time, wherein the bandwidth fluctuation sequence is a difference sequence between an actual sequence and a forecast sequence of bandwidth historical data corresponding to the same time t.

7. The method according to claim 1, wherein the step of obtaining a forecast sequence value of a bandwidth fluctuation sequence according to the bandwidth fluctuation sequence value comprises:
performing zero-mean processing on the bandwidth fluctuation sequence value to obtain a zero-mean processed data sequence value;
performing differential processing on the zero-mean processed data sequence value to obtain a differential data sequence value;
computing a noise sequence value according to the differential data sequence value; and
obtaining the forecast sequence value of the bandwidth fluctuation sequence according to the noise sequence value and the differential data sequence value.

8. The method according to claim 7, wherein the step of computing a noise sequence value comprises:
computing the noise sequence value according to a one-dimensional Akaike information criterion (AIC),
wherein a parameter for indicating accuracy in the one-dimensional AIC is the noise sequence value, and parameters in the least squares algorithm comprise the noise sequence value and the differential data sequence value.

9. The method according to claim 7, wherein the obtaining a forecast sequence value of a bandwidth fluctuation sequence comprises:
obtaining a coefficient and an order of an Auto-Regressive and Moving Average Model (ARMA) model according to a two-dimensional AIC algorithm and a least squares algorithm using the noise sequence value; and
obtaining the forecast sequence value of the bandwidth fluctuation sequence according to the coefficient and order of the ARMA model, the differential data sequence value, and the noise sequence value.

10. The method according to claim 1, wherein the obtaining a bandwidth forecast sequence value according to the bandwidth trend sequence value and the forecast sequence value of the bandwidth fluctuation sequence comprises:
adding the bandwidth trend sequence value and the forecast sequence value of the bandwidth fluctuation sequence to obtain the bandwidth forecast sequence value.

11. A home gateway bandwidth allocation device, comprising at least a processor executing program codes stored in a memory, which configure the bandwidth allocation device to perform the steps of:
collect a bandwidth historical data sequence, expressed as $x_1, x_2 \ldots x_N$ over a sliding window size of N time moments;
obtain a bandwidth trend sequence value, expressed as being a sum of parameter values of bandwidth trend attribute and, and a bandwidth fluctuation sequence value expressed as being a difference between $x_t$ and $x_t'$ according to the collected bandwidth historical data sequence, wherein $x_t$ is an actual sequence value of the bandwidth historical data sequence corresponding to time t, and $x_t'$ is a forecast sequence of the bandwidth historical data sequence;

obtain a forecast sequence value of a bandwidth fluctuation sequence according to the bandwidth fluctuation sequence value;

obtain a bandwidth forecast sequence value according to the bandwidth trend sequence value and the forecast sequence value of the bandwidth fluctuation sequence; and allocate bandwidth according to the bandwidth forecast sequence value at each corresponding time moment N+i.

12. The device according to claim 11, is further configured to:

obtain the parameter values and of a bandwidth trend attribute according to the collected bandwidth historical data sequence; and obtain the bandwidth trend sequence value according to the parameter values of the bandwidth trend attribute.

13. The device according to claim 12, wherein the device is further configured to:

determine a least squares solution of an equation formed by the collected bandwidth historical data sequence $x_t$ and the forecast sequence $x_t'$ corresponding to the bandwidth historical data sequence as the parameter values of the bandwidth trend attribute, wherein the forecast sequence corresponding to the bandwidth historical data sequence is a function related to the parameter value of the bandwidth trend attribute.

14. The device according to claim 12, is further configured to:

obtain the bandwidth fluctuation sequence according to the collected bandwidth historical data sequence $x_1 x_2 \ldots x_N$ and the parameter value of the bandwidth trend attribute.

15. The device according to claim 14, is further configured to:

obtain the forecast sequence value corresponding to the bandwidth historical data sequence $x_t'$ according to the parameter value of the bandwidth trend attribute; and obtain the bandwidth fluctuation sequence value according to the actual sequence value $x_t$ of the bandwidth historical data sequence and the forecast sequence value $x_t'$ of the bandwidth historical data sequence corresponding to the same time, wherein the bandwidth fluctuation sequence is a difference sequence between an actual sequence and a forecast sequence of bandwidth historical data corresponding to the same time t.

16. The device according to claim 11, wherein the device is further configured to:

perform zero-mean processing on the bandwidth fluctuation sequence value to obtain a zero-mean processed data sequence value;

perform differential processing on the zero-mean processed data sequence value to obtain a differential data sequence value;

compute a sequence value according to the differential data sequence value; and obtain the forecast sequence value of the bandwidth fluctuation sequence according to the noise sequence value and the differential data sequence value.

17. The device according to claim 16, is further configured to:

compute the noise sequence value according to a one-dimensional Akaike information criterion (AIC) and a least squares algorithm, wherein a parameter for indicating accuracy in the one-dimensional AIC is the noise sequence value, and parameters in the least squares algorithm comprise the noise sequence value and the differential data sequence value.

18. The device according to claim 16, is further configured to:

obtain coefficient and an order of an Auto-Regressive and Moving Average Model (ARMA) model according to a two-dimensional AIC algorithm and a least squares algorithm using the noise sequence value; and obtain the forecast sequence value of the bandwidth fluctuation sequence according to the coefficient and order of the ARMA model, the differential data sequence value, and the noise sequence value.

19. The device according to claim 11, wherein the device is specifically configured to add the bandwidth trend sequence value and the forecast sequence value of the bandwidth fluctuation sequence to obtain the bandwidth forecast sequence value.

* * * * *